(12) United States Patent
Yoshimura (10) Patent No.: US 12,368,972 B2
(45) Date of Patent: Jul. 22, 2025

(54) IMAGE PICKUP APPARATUS INCLUDING PULSE WAVE DETECTION UNIT, CONTROL METHOD THEREFOR, AND STORAGE MEDIUM

(71) Applicant: CANON KABUSHIKI KAISHA, Tokyo (JP)

(72) Inventor: Hidemasa Yoshimura, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 88 days.

(21) Appl. No.: 18/359,534

(22) Filed: Jul. 26, 2023

(65) Prior Publication Data
US 2024/0048861 A1 Feb. 8, 2024

(30) Foreign Application Priority Data
Aug. 3, 2022 (JP) ................. 2022-124217

(51) Int. Cl.
*H04N 25/53* (2023.01)
*H04N 23/63* (2023.01)
*H04N 25/62* (2023.01)

(52) U.S. Cl.
CPC ........... *H04N 25/53* (2023.01); *H04N 23/634* (2023.01); *H04N 25/62* (2023.01)

(58) Field of Classification Search
CPC ...... H04N 25/53; H04N 23/634; H04N 25/62; H04N 23/611; H04N 23/73

USPC ......................................................... 348/296
See application file for complete search history.

(56) References Cited

U.S. PATENT DOCUMENTS

2015/0260939 A1* 9/2015 Yan ................... G02B 7/003
359/793
2015/0281581 A1* 10/2015 Sakurai ............ H04N 23/6812
348/208.2
2020/0314330 A1* 10/2020 Takayama ............. H04N 23/65

FOREIGN PATENT DOCUMENTS

JP 2005-331716 A 12/2005
JP 2005331716 * 12/2005 ............. H04N 5/232

* cited by examiner

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

An image pickup apparatus capable of correctly determining an exposure permission period from a pulse wave signal. The image pickup apparatus comprising an image pickup portion, and a pulse wave detector configured to detect a pulse wave of a photographer who is holding a main body portion including the image pickup portion. The image pickup apparatus determines, based on a change amount of a pulse wave signal output from the pulse wave detector, a permission period in which exposure by the image pickup portion is permitted and a non-permission period in which the exposure by the image pickup portion is not permitted, and controls the exposure by the image pickup portion, based on the determined permission period and the determined non-permission period.

12 Claims, 10 Drawing Sheets

IMAGE PICKUP APPARATUS INCLUDING PULSE WAVE DETECTION UNIT, CONTROL METHOD THEREFOR, AND STORAGE MEDIUM

BACKGROUND OF THE INVENTION

Field of the Invention

The present invention relates to an image pickup apparatus, a control method therefor, and a storage medium, and particularly relates to control of an image pickup apparatus including a pulse wave detection unit.

Description of the Related Art

When the camera is held and an image is picked up, a clear image may not be picked up due to the occurrence of camera shake. Therefore, a camera equipped with a function to suppress the occurrence of shake in a shot image (hereinafter, referred to as an "image shake correction function"), by detecting camera shake using an acceleration sensor or an angular velocity sensor and moving a correction lens or an image pickup device in a direction opposite to a direction of the camera shake, has been widely used.

There is some camera shakes which is called pulse wave shake caused by a pulse wave of a photographer holding a camera. The pulse wave shake has a short period, and thus cannot be canceled by the above-described image shake correction function, and as a result, there is a problem that blurring remains in the shot image.

In view of this problem, a technique for avoiding pulse wave shake by a method different from the image shake correction function is disclosed. For example, Japanese Laid-Open Patent Publication (kokai) No. 2005-331716 discloses a technique for predicting a period in which pulse wave shake occurs from a pulse wave of a photographer read by a pulse wave sensor and avoiding image pickup in the period.

In the technique disclosed in Japanese Laid-Open Patent Publication (kokai) No. 2005-331716, a threshold is provided for a signal level (amplitude) of a pulse wave signal output from the pulse wave sensor, and a period in which image pickup (exposure) is permitted is determined. Therefore, there is a possibility that when the signal level of the pulse wave signal changes due to a change in the positional relationship between the pulse wave sensor and the finger, a change in the way the finger is placed on the pulse wave sensor, or the like, the period in which exposure is permitted is erroneously determined.

SUMMARY OF THE INVENTION

The present invention provides an image pickup apparatus capable of correctly determining an exposure permission period from a pulse wave signal, a control method therefor, and a storage medium.

Accordingly, the present invention provides an image pickup apparatus comprising an image pickup portion, a pulse wave detector configured to detect a pulse wave of a photographer who is holding a main body portion including the image pickup portion, at least one memory that stores a set of instructions, and at least one processor that is configured to, based on the instructions, cause the image pickup apparatus to determine, based on a change amount of a pulse wave signal output from the pulse wave detector, a permission period in which exposure by the image pickup portion is permitted and a non-permission period in which the exposure by the image pickup portion is not permitted, and control the exposure by the image pickup portion, based on the determined permission period and the determined non-permission period.

According to the present invention, it is possible to correctly determine the exposure permission period from the pulse wave signal.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
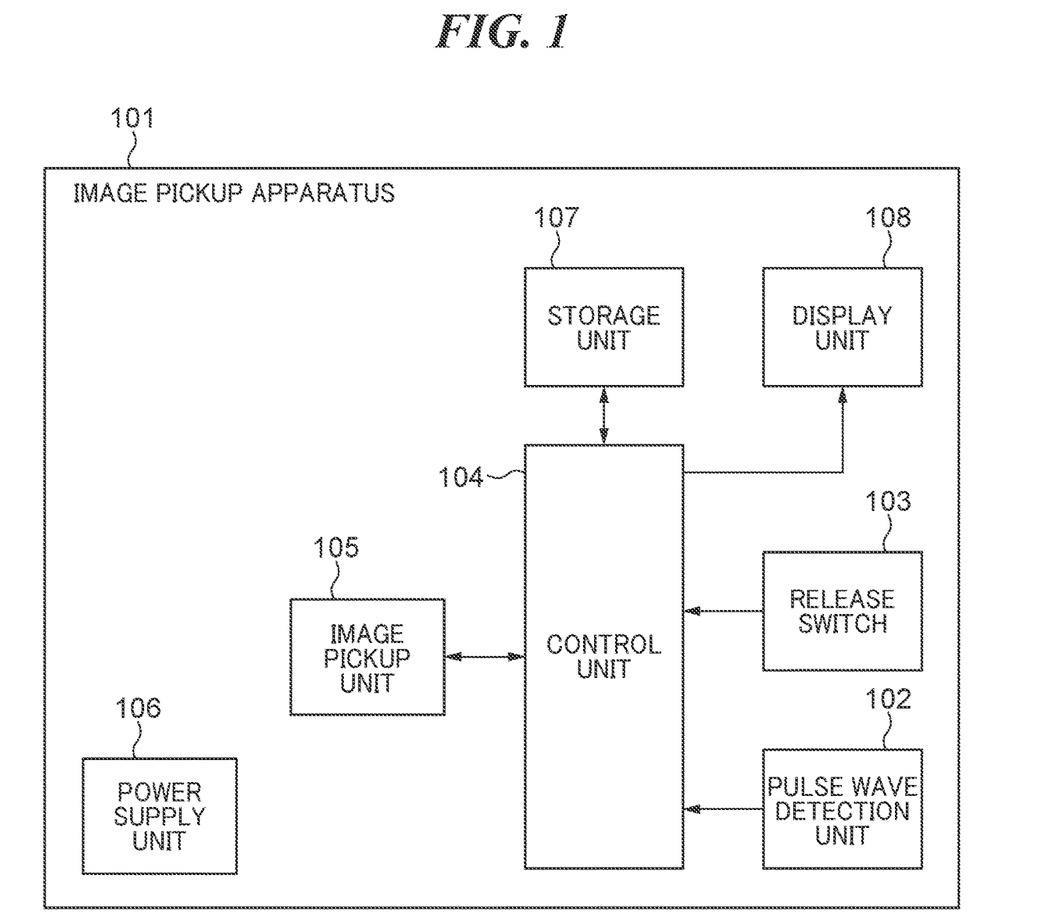
FIG. 1 is a block diagram showing a schematic configuration of an image pickup apparatus according to a first embodiment.

FIG. 1 is a block diagram showing a schematic configuration of an image pickup apparatus 101 according to a first embodiment. The image pickup apparatus 101 includes a pulse wave detection unit 102, a release switch 103, a control unit 104, an image pickup unit 105, a power supply unit 106, a storage unit 107, and a display unit 108. It should be noted that, here, a digital camera such as a mirrorless single-lens camera or a single-lens reflex camera, to which a lens barrel (interchangeable lens) can be attached and detached, is assumed as the image pickup apparatus 101, and thus, the image pickup apparatus 101 corresponds to a main body portion of a mirrorless single-lens camera, a single-lens reflex camera, or the like.

The pulse wave detection unit 102 detects a pulse wave of a photographer (user) when the photographer holds the image pickup apparatus 101, and outputs the pulse wave to the control unit 104 as a pulse wave signal. As the pulse wave detection unit 102, for example, a photoelectric pulse wave sensor or a piezoelectric pulse wave sensor can be used; however, the pulse wave detection unit 102 is not limited thereto. The release switch 103 is a switch to be pressed when the photographer picks up an image by the image pickup unit 105. When the release switch 103 is pressed, an image pickup instruction signal instructing start of image pickup is transmitted to the control unit 104.

The control unit 104 includes, for example, a system LSI and a DRAM, and controls the overall operation of the image pickup apparatus 101 by controlling the image pickup unit 105, the storage unit 107, and the display unit 108. Furthermore, when receiving the pulse wave signal from the pulse wave detection unit 102 and the image pickup instruction signal from the release switch 103, the control unit 104 outputs a control signal for instructing the start of exposure, the end of exposure, transmission of video information, initialization of the image pickup unit 105 (initialization of video information), and the like to the image pickup unit 105. It should be noted that various programs and the like for controlling the operation of the image pickup apparatus 101 are stored in the ROM constituting the system LSI.

The image pickup unit 105 includes an image pickup device such as a CMOS sensor or a CCD sensor, and an A/D converter that converts an analog image pickup signal output from the image pickup device into a digital image signal. The image pickup unit 105 performs an image pickup operation in accordance with a control signal from the control unit 104, and transmits the generated image signal to the control unit 104.

The storage unit 107 is a nonvolatile memory capable of holding data (information) without power being supplied, stores various settings and the like for operating the image pickup apparatus 101, and stores shot image data and the like. It should be noted that, in the following description, in the image pickup apparatus 101, the control unit 104 performs predetermined image processing on the image signal to generate shot image data in a predetermined format.

The power supply unit 106 supplies a voltage received from a supply source such as a battery or an AC adapter, at an appropriate voltage value, to various electronic components and various electric components used in the image pickup apparatus 101. The display unit 108 includes, for example, a liquid crystal display and a touch sensor, and can display a graphical photographer interface (GUI) and display results of various types of processing by the control unit 104. The display unit 108 is further used as an input unit (operation unit).

Figure 2:
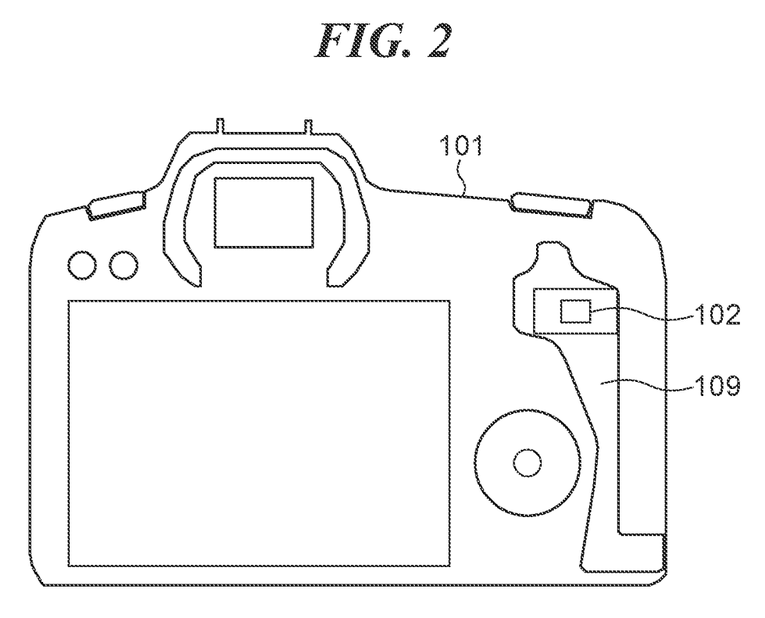
FIG. 2 is a rear view of the image pickup apparatus of FIG. 1.

FIG. 2 is a rear view of the image pickup apparatus 101. The pulse wave detection unit 102 is disposed on a grip portion 109 provided on the back surface of the image pickup apparatus 101. Here, the pulse wave detection unit 102 is provided at a position where the finger (generally the thumb) abuts when the photographer holds the image pickup apparatus 101 so as to make smaller camera shake. However, the position of the pulse wave detection unit 102 is not limited thereto. The position of the pulse wave detection unit 102 may be any position as long as the photographer may touch the pulse wave detection unit 102 by hand when holding the image pickup apparatus 101, and may be, for example, a side surface of the image pickup apparatus 101.

Figure 3:
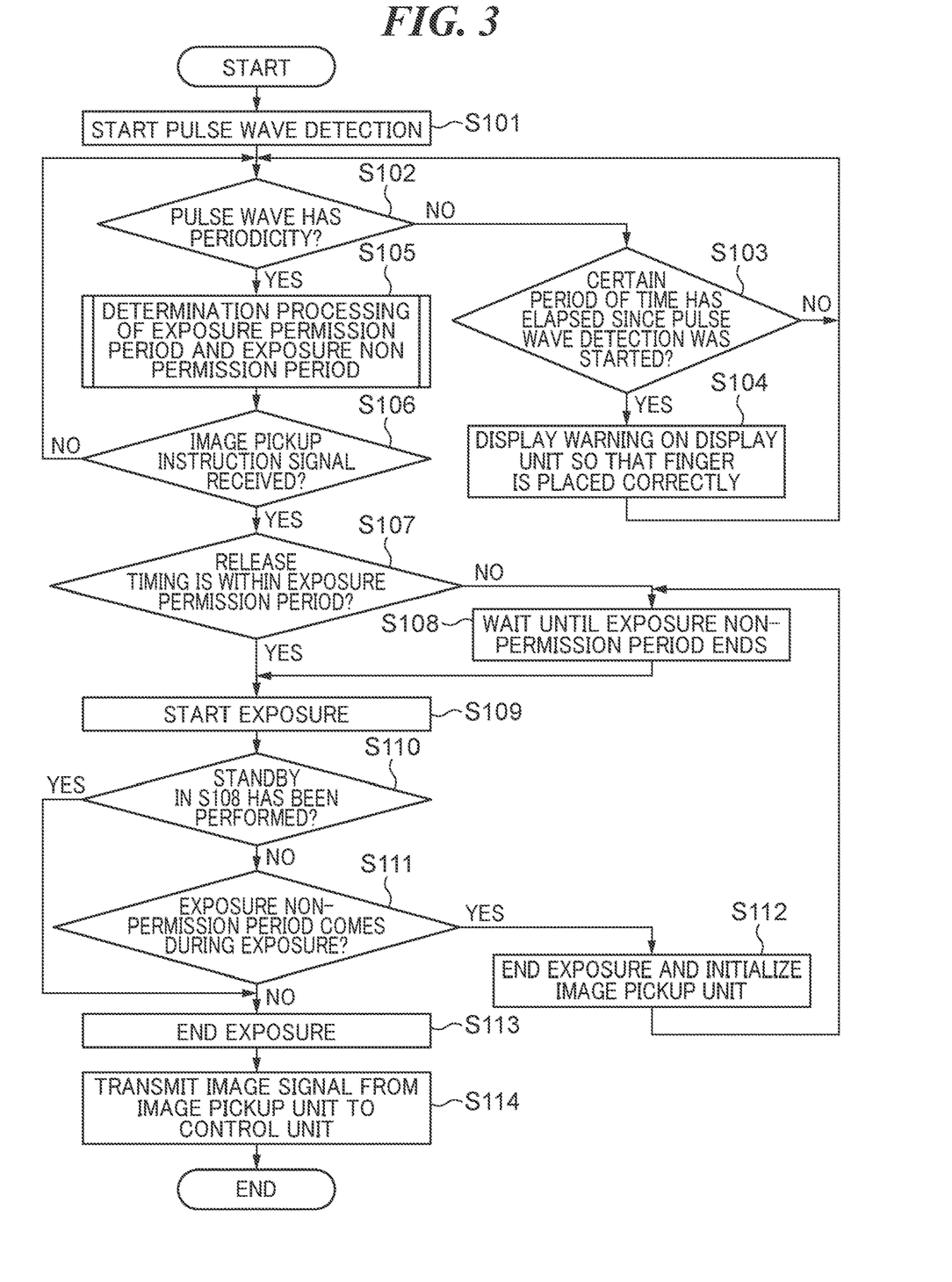
FIG. 3 is a flowchart showing an operation of the image pickup apparatus of FIG. 1.

FIG. 3 is a flowchart showing an operation of the image pickup apparatus 101. Each processing (step) indicated by an S number in this flowchart is realized, by the system LSI of the control unit 104 executing a predetermined program stored in the control unit 104 to comprehensively control the operation of each unit of the image pickup apparatus 101.

After activation of the image pickup apparatus 101, in S101, the pulse wave detection unit 102 starts pulse wave detection (pulse wave measurement) of the photographer, and transmits the detected pulse wave to the control unit 104 as a pulse wave signal.

In step S102, the control unit 104 determines whether or not the pulse wave signal received from the pulse wave detection unit 102 is a periodic signal. In a case of determining that the signal is not a periodic signal (NO in S102), the control unit 104 executes the processing of S103.

In S103, the control unit 104 determines whether or not a certain period of time has elapsed since the pulse wave detection unit 102 started the pulse wave detection. In a case of determining that the certain period of time has not elapsed (NO in S103), the control unit 104 executes the processing of S102 again, and in a case of determining that the certain period of time has elapsed (YES in S103), the control unit 104 executes the processing of S104.

In S104, the control unit 104 displays a warning such as "Please place your finger at the correct position" on the display unit 108, and then executes the processing of S102 again.

In a case of determining in the processing of S102 that the signal is a periodic signal (YES in S102), the control unit 104 records the detected pulse wave cycle, and then executes the processing of S105. It should be noted that the control unit 104 determines that the pulse wave signal is a periodic signal in a case where the pulse wave signal repeatedly increases and decreases at the same cycle as the pulse of a human. For example, in a case where the pulse wave signal repeatedly increases and decreases at a constant cycle of 0.25 seconds to 2 seconds, it is determined that the pulse wave signal is a periodic signal. However, the method of determining a periodic signal is not limited thereto.

In S105, the control unit 104 starts determination processing of an exposure permission period and an exposure non-permission period. That is, the control unit 104 starts processing of determining a period in which the exposure by the image pickup unit 105 is permitted (exposure permission period) and a period in which the exposure is not permitted (exposure non-permission period), from the change amount of the pulse wave signal. It should be noted that "permitting the exposure by the image pickup unit 105" here refers to "permitting exposure to an image pickup device for image pickup to be performed for the purpose of storing (image data of) a shot image", and that is, exposure to the image pickup device for acquiring so-called a live view video is not intended. The determination result by the processing of S105 is updated as needed even after S106. It should be noted that details of the processing of S105 will be described later.

In S106, the control unit 104 determines whether or not an image pickup instruction signal has been received. As described above, the image pickup instruction signal is input to the control unit 104 by the release switch 103 being pressed. In a case of determining that the image pickup instruction signal has not been received (NO in S106), the control unit 104 executes the processing of S102 again, and in a case of determining that the image pickup instruction signal has been received (YES in S106), the control unit 104 executes the processing of S107.

In S107, the control unit 104 determines whether or not the timing at which the image pickup instruction signal is received (hereinafter, referred to as "release timing") is within the exposure permission period. In a case of determining that the release timing is within the exposure permission period (YES in S107), the control unit 104 executes the processing of S109, and in a case of determining that the release timing is not within the exposure permission period (NO in S107), the control unit 104 executes the processing of S108.

In S108, the control unit 104 waits until the exposure non-permission period ends. The control unit 104 executes the processing of S109 as soon as the exposure non-permission period ends so that the exposure can be performed simultaneously with the switch to the exposure permission period from the end of the exposure non-permission period.

In S109, the control unit 104 transmits a control signal for instructing the start of exposure to the image pickup unit 105. As a result, the image pickup unit 105 that has received the control signal starts exposure.

In S110, the control unit 104 determines whether or not the standby in S108 has been performed. In a case of determining that the standby in S108 has been performed (YES in S110), the control unit 104 executes the processing of S113, and in a case of determining that the standby in S108 has not been performed (NO in S110), the control unit 104 executes the processing of S111.

In S111, the control unit 104 determines whether or not the exposure non-permission period is going to come (it is going to enter the exposure non-permission period) while the exposure is being performed. In other words, the control unit 104 determines whether or not the exposure ends within the exposure permission period. In a case of determining the exposure non-permission period is going to come during the exposure (YES in S111), the control unit 104 executes the processing of S112, and in a case of determining the exposure non-permission period is not going to come during the exposure (NO in S111), the control unit 104 executes the processing of S113.

In step S112, the control unit 104 transmits, to the image pickup unit 105, a control signal for instructing the end of the exposure and the initialization of the image pickup unit 105 (video information). The image pickup unit 105 that has received the control signal in S112 terminates the exposure and initializes the image pickup unit 105, and then processing advances to S108. As a result, image pickup is started again after the end of the exposure non-permission period, that is, at the start of the next exposure permission period.

In S113, the control unit 104 transmits a control signal for instructing the end of the exposure to the image pickup unit 105. The image pickup unit 105 that has received the control signal in S113 terminates the exposure, and accordingly, the image pickup is normally terminated.

In step S114, the control unit 104 transmits, to the image pickup unit 105, a control signal instructing transmission of the image signal to the control unit 104. The image pickup unit 105 that has received the control signal in S114 transmits the image signal to the control unit 104, thereby ending the processing of this flowchart. It should be noted that the control unit 104 that has received the image signal performs predetermined image processing on the received image signal to generate image data, and stores the generated image data in the storage unit 107.

Figure 4:
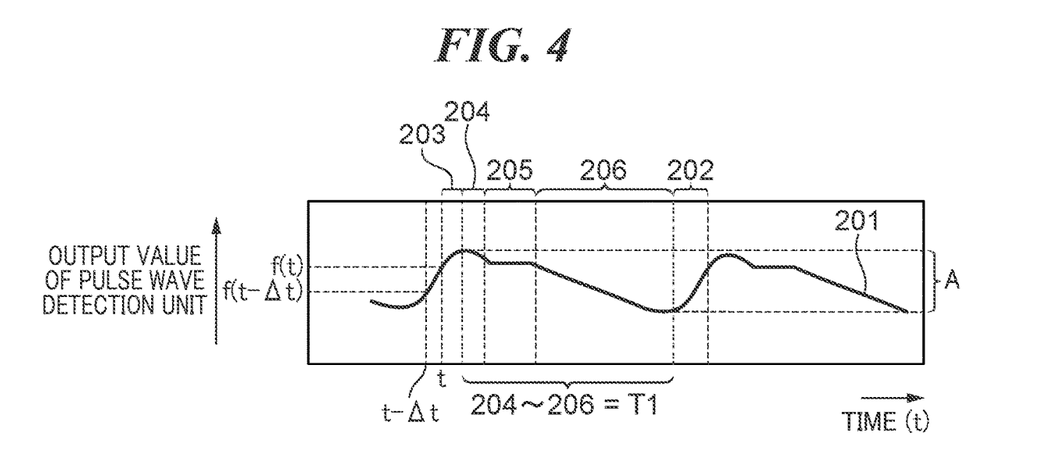
FIG. 4 is a schematic diagram showing a first example of processing of determining an exposure non-permission period from a pulse wave signal.

Next, the processing of S105 of the flowchart of FIG. 3 (processing of determining the exposure permission period and the exposure non-permission period) will be described in detail. FIG. 4 is a schematic diagram showing a first example of processing of determining the exposure non-permission period from a pulse wave signal 201, and is a diagram showing a relationship between a waveform example of the pulse wave signal received by the control unit 104 and the exposure non-permission period and the exposure non-permission period. It is assumed that the pulse wave detection unit 102 has a specification in which the output value increases as the volume of the blood vessel of the finger increases. However, the specification of the pulse wave detection unit 102 is not limited thereto.

The pulse wave signal 201 output from the pulse wave detection unit 102 generally includes a steep rise period 202, a gentle rising period 203, a first half falling period 204, a stagnation period 205, and a second half falling period 206, and peaks and valleys are alternately repeated.

The pulse wave signal 201 rises steeply as blood is pumped out by a contraction of the heart, whereby the steep rise period 202 appears. When the contraction of the heart ends, the blood flows by means of inertia, and thus the rise of the pulse wave signal 201 becomes gentle, whereby the gentle rising period 203 appears. Subsequently, the first half falling period 204 appears as the pulse wave signal 201 starts falling gradually, the stagnation period 205 in which the falling of the pulse wave signal 201 once stagnates appears, and then the second half falling period 206 in which the pulse wave signal 201 gradually falls again appears. Then, as the blood is again pumped out by the contraction of the heart, the steep rise period 202 appears in the pulse wave signal 201.

A period in which the pulse exerts a large force on the outside (a period in which the force for generating the pulse wave shake in the image pickup apparatus 101 is generated) is the steep rise period 202. However, since it takes time for the shake due to the pulse to be transmitted to the image pickup apparatus 101, the pulse wave shake in the image pickup apparatus 101 occurs in the stagnation period 205 in which the change in the pulse wave stagnates. Therefore, in the present embodiment, in order to avoid the pulse wave shake in the image pickup apparatus 101, the exposure is not permitted in the stagnation period 205, and the exposure is permitted in a period other than the stagnation period 205 (the steep rise period 202, the gentle rising period 203, the first half falling period 204, and the second half falling period 206).

As a specific example of processing (method) in which the control unit 104 obtains, in S105, the stagnation period 205 which is the exposure non-permission period from the pulse wave signal 201, first to third examples will be described below. However, the method of obtaining the exposure non-permission period is not limited to the following first to third examples.

The processing of the first to third examples is performed in a period T1 in which the blood vessel of the finger contracts (the first half falling period 204, the stagnation period 205, and the second half falling period 206).

First, the first example will be described. As shown in FIG. 4, the control unit 104 uses the time t, the value f(t) of the pulse wave signal at the time t, and the time interval Δt, to calculate a change amount $\Delta f_1(t)$ of the pulse wave signal by the following formula (1).

$$\Delta f_1(t) = f(t) - f(t - \Delta t) \tag{1}$$

Here, the time interval Δt is determined from the cycle of the pulse wave signal recorded in S102 of the flowchart of FIG. 3. The time interval Δt is equal to or longer than the sampling interval, and is set to a value (for example, 1/100 seconds) smaller than the period T1 in which the blood vessel of the finger contracts. In order to obtain the change amount $\Delta f_1(t)$ of the pulse wave signal, the control unit 104 stores the values of f(t) and f(t−Δt) and updates the values every time interval Δt.

In the first example, the predetermined first value k and second value α are used. Specific examples of the first value k and the second value α will be described later. Then, absolute value at each of k+1 change amounts $\Delta f_1(t)$, $\Delta f_1(t-\Delta t)$, $\Delta f_1(t-2\Delta t)$, $\cdots$, $\Delta f_1(t-k\Delta t)$ are obtained. The control unit 104 determines the stagnation period 205, which corresponds to the exposure non-permission period, by the time t satisfying the condition that all the absolute values of the k+1 change amounts are less than the second value $\alpha$. The control unit 104 determines a period other than the determined stagnation period 205 as an exposure permission period. It should be noted that k+1 values of $\Delta f_1(t)$ and so on are updated every time interval $\Delta t$, whereby the exposure permission period and the exposure non-permission period are updated every time interval $\Delta t$.

The first value k is determined from the cycle of the pulse wave signal recorded in the case where the processing of S102 of FIG. 3 determines that the signal is periodic. Specifically, the first value k is set to a positive number (for example, 10) such that the time $k\Delta t$ is shorter than the period T1 in which the blood vessel of the finger contracts. The first value k may be determined in advance, or may be set each time according to the shutter speed.

If the first value k is too large, the exposure permission period becomes short. That is, the exposure is permitted only in a case of the shutter speed being set to be high. On the other hand, if the first value k is too small, it is determined as the exposure permission period although as the exposure non-permission period is to be determined, so that there is a possibility that pulse wave shake occurs in the shot image.

The second value $\alpha$ is determined by the cycle of the pulse wave signal and the output value in one cycle of the pulse wave signal. The second value $\alpha$ is determined under the condition of $0<\alpha<A\times k\times\Delta t/T1$, using the period T1 in which the blood vessel of the finger contracts in the cycle of the pulse wave signal and the amplitude A of the pulse wave signal.

It should be noted that the third value j may be set, and the time t in a case where j or more of the absolute values of the k+1 change amounts $\Delta f_1(t)$ and so on are less than the second value $\alpha$, may be determined to be within the stagnation period 205. It should be noted that the third value j is determined from the cycle of the pulse wave signal recorded in a case where the processing of S102 determines that the signal is periodic. For example, in a case where the first value k is '10', the third value j is set to '5' or the like.

Figure 5:
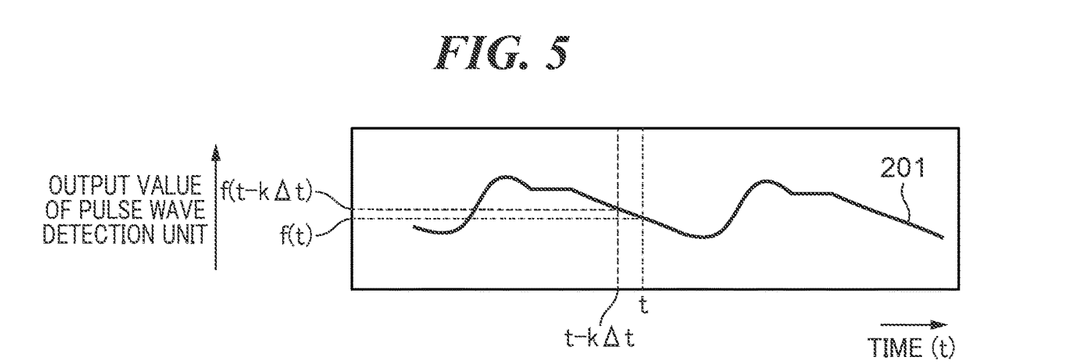
FIG. 5 is a schematic diagram showing a second example of processing of determining an exposure non-permission period from a pulse wave signal.

Next, the second example will be described. FIG. 5 is a schematic diagram showing the second example of the processing of determining the exposure non-permission period from the pulse wave signal 201. In the second example, the control unit 104 uses the time t, the value f(t) of the pulse wave signal at the time t, the time interval $\Delta t$, and the first value k, to calculate the change amount $\Delta f_2(t)$ of the pulse wave signal by the following formula (2). It should be noted that the time interval $\Delta t$ and the first value k are determined in the same manner as that in the first example.

$$\Delta f_2(t)=f(t)-f(t-k\Delta t) \qquad (2)$$

In order to obtain the change amount $\Delta f_2(t)$ of the pulse wave signal, the control unit 104 stores k+1 values of f(t), f(t–$\Delta t$), f(t–2$\Delta t$), $\cdots$, f(t–k$\Delta t$), and updates the values every time interval $\Delta t$. In the second example, the control unit 104 determines the stagnation period 205, which corresponds to the exposure non-permission period, by the time t satisfying the condition that the absolute value of $\Delta f_2(t)$ is less than the second value $\alpha$. The control unit 104 determines a period other than the determined stagnation period 205 as an exposure permission period. It should be noted that the second value $\alpha$ is determined in the same manner as that in the first example. The control unit 104 updates the exposure permission period and the exposure non-permission period every time interval $\Delta t$.

Figure 6:
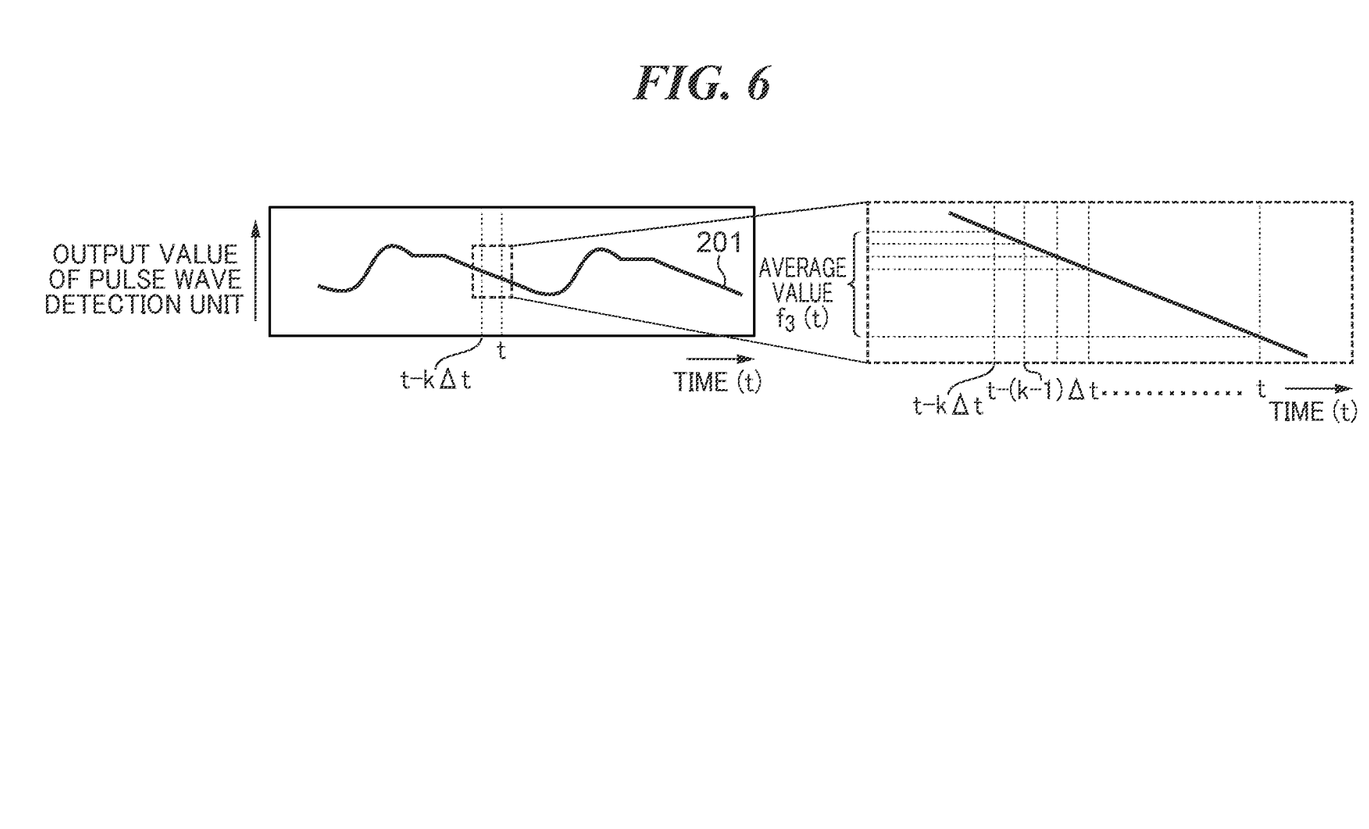
FIG. 6 is a schematic diagram showing a third example of processing of determining an exposure non-permission period from a pulse wave signal.

Next, the third example will be described. FIG. 6 is a schematic diagram showing the third example of the processing of determining the exposure non-permission period from the pulse wave signal 201. In the third example, the control unit 104 uses the time t, the value f(t) of the pulse wave signal at the time t, the time interval $\Delta t$, and the first value k, to calculate the moving average value $f_3(t)$ of the pulse wave signal at the time t by the following formula (3). Subsequently, the control unit 104 uses the time t, the moving average value $f_3(t)$ of the pulse wave signal at the time t, and the time interval $\Delta t$, to calculate the change amount $\Delta f_4(t)$ of the pulse wave signal at the time t by the following formula (4). It should be noted that the time interval $\Delta t$ and the first value k are determined in the same manner as that in the first example.

$$f_3(t) = \frac{\sum_{i=0}^{k} f(t-i\Delta t)}{k+1} \qquad (3)$$

$$\Delta f_4(t) = f_3(t) - f_3(t-\Delta t) \qquad (4)$$

In order to obtain the change amount $\Delta f_4(t)$ of the pulse wave signal, the control unit 104 stores k+1 values of f(t), f(t–$\Delta t$), f(t–2$\Delta t$), $\cdots$, f(t–k$\Delta t$), and updates the values every time interval $\Delta t$. The control unit 104 determines the stagnation period 205 corresponding to the exposure non-permission period by the time t satisfying the condition that the absolute value of $\Delta f_4(t)$ is less than the second value $\alpha$. The control unit 104 determines a period other than the determined stagnation period 205 as an exposure permission period. It should be noted that the second value $\alpha$ is determined in the same manner as that in the first example. The control unit 104 updates the exposure permission period and the exposure non-permission period every time interval $\Delta t$.

In the case of using the method based on the change amount of the pulse wave signal as in the first to third examples described above in order to determine the exposure non-permission period and the exposure permission period, there are the following advantages as compared with the case of using the method based on the predetermined output level of the pulse wave signal. That is, there is a possibility that the method using the output level of the pulse wave signal as a reference may erroneously determine the exposure non-permission period in a case where the output level of the pulse wave signal changes due to a change in the positional relationship between the pulse wave detection unit 102 and the finger, a change in the way the finger is placed, or the like. On the other hand, the method using the change amount of the pulse wave signal as a reference can correctly determine the exposure non-permission period even if the output value of the pulse wave detection unit 102 changes due to a change in the positional relationship between the pulse wave detection unit 102 and the finger, a change in the way the finger is placed, or the like.

Figure 7:
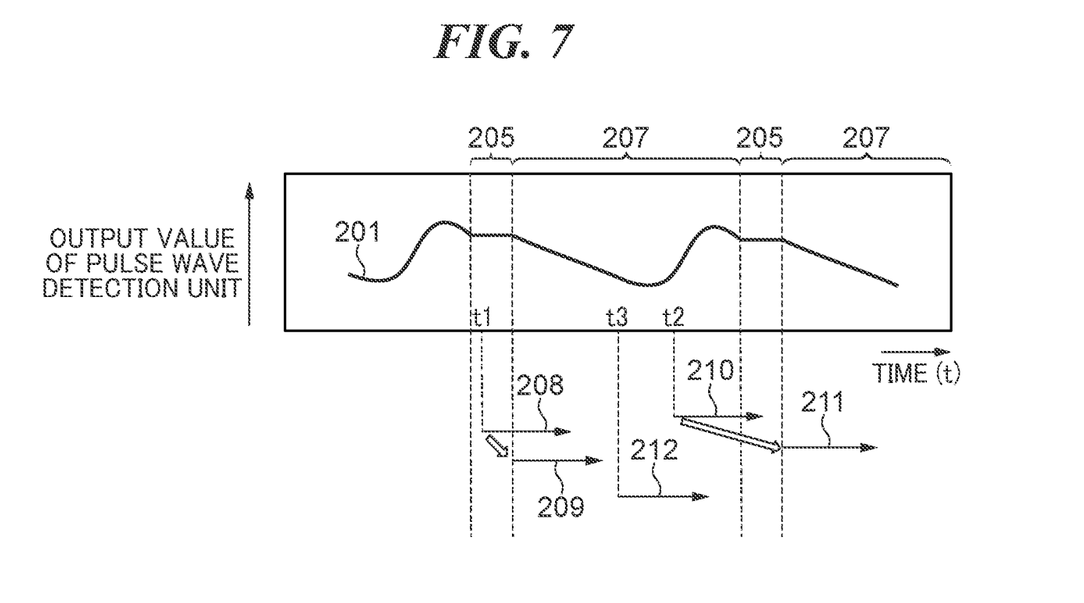
FIG. 7 is a diagram showing a relationship between release timing and an exposure period, and a pulse wave signal.

Next, the processing of S107 to S114 of the flowchart of FIG. 3 will be described in detail with reference to FIG. 7. FIG. 7 is a diagram showing a relationship between the release timing and the exposure period, and the pulse wave signal 201.

In FIG. 7, a period other than the stagnation period 205 (the steep rise period 202, the gentle rising period 203, the first half falling period 204, and the second half falling period 206) which corresponds to an exposure non-permission period is indicated by an exposure permission period 207.

As an example, it is assumed that by the photographer pressing the release switch 103, the control unit 104 receives, at time t1, an exposure start instruction for an exposure period 208. In this case, since the time t1 is within the stagnation period 205, in the flowchart of FIG. 3, after the processing of S107, the processing proceeds to S108, and the control unit 104 waits until the stagnation period 205 ends in S108. In this way, the exposure period 208 is corrected to an exposure period 209 of which the exposure start timing is the start time of the next exposure permission period 207, and the processing of S109 is executed. Thereafter, the control unit 104, which has performed the standby in S108, determines as YES in S110, skips S111, and proceeds the processing to S113. Then, the exposure by the image pickup unit 105 ends in S113, and an image signal is transmitted from the image pickup unit 105 to the control unit 104 in S114. In this way, image pickup is performed slightly later than the timing when the photographer presses the release switch 103.

As another example, it is assumed that by the photographer pressing the release switch 103, the control unit 104 receives, at time t2, an exposure start instruction for an exposure period 210. In this case, since the time t2 is within the exposure permission period 207, the processing proceeds from S107 to S109, in the flowchart of FIG. 3, and the exposure by the image pickup unit 105 is started. Subsequently, since the standby in S108 has not been performed, after S110 (NO), the processing proceeds to S111.

Since the exposure period 210 enters the stagnation period 205 during the exposure, the processing proceeds to S112 after the processing of S111. In S112, the exposure by the image pickup unit 105 is forcibly terminated, and the image pickup unit 105 is initialized. Thereafter, in S108, the control unit 104 waits until the stagnation period 205 ends. In this way, the exposure period 210 is corrected to an exposure period 211 of which the exposure start timing is the start time of the next exposure permission period 207, and the processing of S109 is executed. Then, the control unit 104, which has performed the standby in S108, determines as YES in S110, skips S111, and proceeds the processing to S113. Then, the exposure by the image pickup unit 105 ends in S113, and an image signal is transmitted from the image pickup unit 105 to the control unit 104 in S114. In this way, image pickup is performed slightly later than the timing when the photographer presses the release switch 103.

As still another example, it is assumed that by the photographer pressing the release switch 103, the control unit 104 receives, at time t3, an exposure start instruction for an exposure period 212. In this case, since the time t3 is within the exposure permission period 207, the processing proceeds from S107 to S109, in the flowchart of FIG. 3, and the exposure by the image pickup unit 105 is started. Subsequently, since the standby in S108 has not been performed, after S110 (NO), the processing proceeds to S111. The entire period from the exposure start to the exposure end of the exposure period 212 falls within the exposure permission period 207. Therefore, in the flowchart of FIG. 3, after the processing of S111, the processing proceeds to S113, the exposure by the image pickup unit 105 ends in S113, and the image signal is transmitted from the image pickup unit 105 to the control unit 104 in S114. That is, image pickup is performed at the timing when the photographer presses the release switch 103.

As described above, in S107 to S111 of FIG. 3, the exposure timing is adjusted by collating the stagnation period 205 (exposure non-permission period) and the exposure permission period 207, which are updated as needed in the processing started in S105, with the exposure period. It should be noted that the processing of S107 to S111 is not limited to the above-described method. For example, a method of, from the previously obtained exposure permission period and previously obtained exposure non-permission period and the cycle of the pulse wave signal, predicting the subsequent exposure permission period and exposure non-permission period, and collating the exposure start timing and the exposure period with the predicted exposure permission period and predicted exposure non-permission period, may be used.

As described above, in the first embodiment, only in a case where the periodic pulse wave signal is detected in S102, the exposure non-permission period and the exposure permission period are obtained, and the exposure timing is adjusted in response to the pressing of the release switch 103. In a case where a certain period of time has elapsed without a periodic pulse wave signal being detected, a warning is displayed on the display unit 108 in S104 to cause the finger to abut on a correct position. As a result, it is possible to urge the photographer to hold the image pickup apparatus 101 in a state in which camera shake including pulse wave shake hardly occurs.

Furthermore, by not permitting the exposure in the stagnation period 205 in which the pulse wave shake occurs in the image pickup apparatus 101, the occurrence of the pulse wave shake in the image pickup apparatus 101 can be avoided, which improves the quality of the image signal. At that time, by determining the stagnation period 205 which corresponds to the exposure non-permission period based on the change amount of the pulse wave signal, the stagnation period 205 can be correctly determined even if the output value of the pulse wave detection unit 102 changes due to a change in the positional relationship between the pulse wave detection unit 102 and the finger, a change in the way the finger is placed, or the like. Further, in a case where the image pickup instruction signal is received in the stagnation period 205, by shifting the exposure start timing to the start time of next exposure permission period 207, image pickup in which the occurrence of the pulse wave shake is suppressed can be performed. Furthermore, in a case where the stagnation period 205 comes during the exposure, the image pickup is performed again from the start time of next exposure permission period, whereby the image pickup in which the occurrence of the pulse wave shake is suppressed can be performed.

It should be noted that, referring to the shutter speed that has not been mentioned so far, in a case of a low shutter speed at which the exposure period covers the exposure permission period 207 (in a case where an exposure time longer than the exposure permission period is required), the exposure cannot be started. Therefore, the image pickup apparatus 101 may be configured to enable and function the function of the exposure control in the present embodiment, only at a high shutter speed (for example, only at a shutter speed higher (faster) than a predetermined speed by which the exposure time is shorter than ¼ seconds). Furthermore, the image pickup apparatus 101 may be configured to be able to select the validity/invalidity of the function of exposure control in the present embodiment from a setting screen or the like displayed on the display unit 108.

Figure 8:
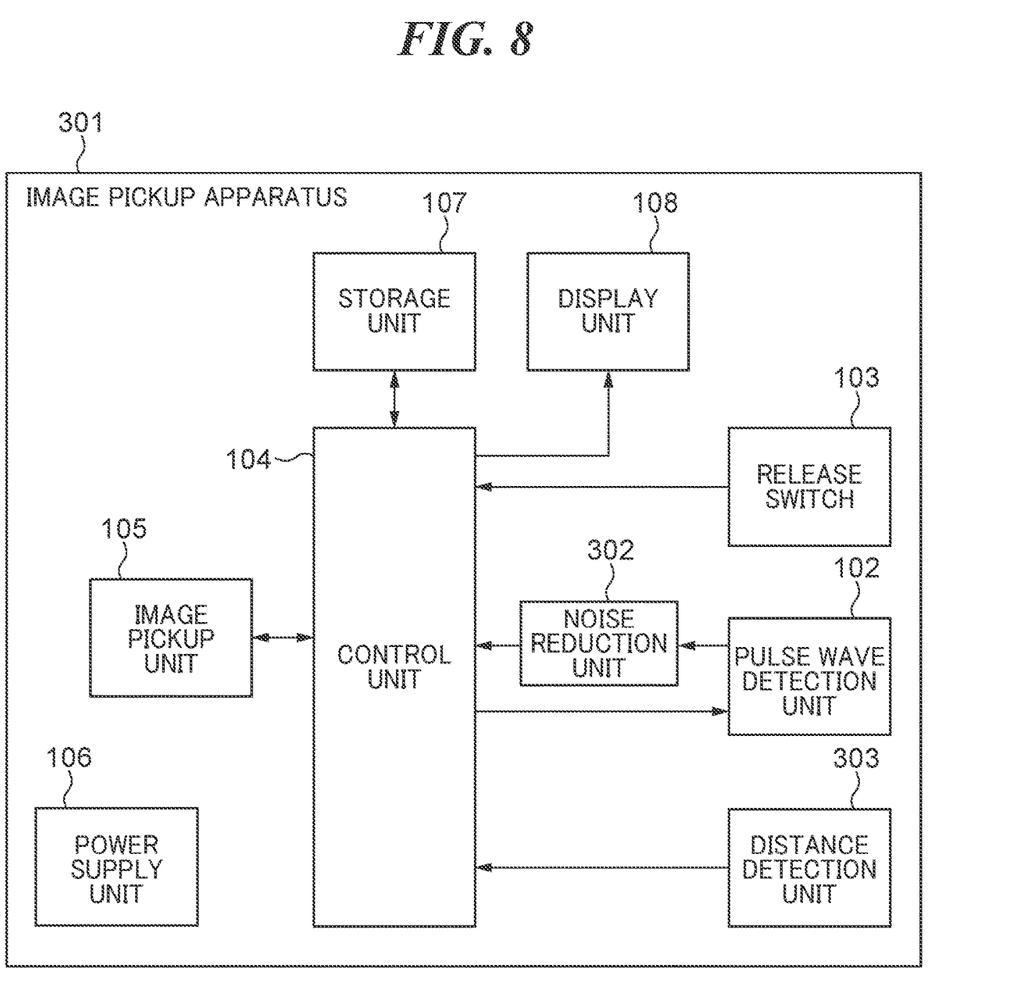
FIG. 8 is a block diagram showing a schematic configuration of an image pickup apparatus according to a second embodiment.

FIG. 8 is a block diagram showing a schematic configuration of an image pickup apparatus 301 according to a second embodiment. It should be noted that, among the components of the image pickup apparatus 301, components corresponding to the components of the image pickup apparatus 101 according to the first embodiment are denoted by the same names and reference numerals, and redundant description will be omitted.

The image pickup apparatus 301 includes a pulse wave detection unit 102, a release switch 103, a control unit 104, an image pickup unit 105, a power supply unit 106, a storage unit 107, a display unit 108, a noise reduction unit 302, and a distance detection unit 303.

The pulse wave detection unit 102 receives, from the control unit 104, a signal (hereinafter, referred to as a "pulse wave detection start signal") instructing to start detection of a pulse wave. The pulse wave detection unit 102 does not detect the pulse wave until receiving the pulse wave detection start signal, and starts detection of the pulse wave with the reception of the pulse wave detection start signal as a trigger. In addition to the functions described in the first embodiment, the pulse wave detection unit 102 can also start pulse wave detection by a pulse wave detection start signal received from an external device.

The noise reduction unit 302 receives the pulse wave signal output from the pulse wave detection unit 102, reduces noise of the received pulse wave signal, and transmits a well-formed pulse wave signal to the control unit 104. As the noise reduction unit 302, for example, a low-pass filter is used; however, the noise reduction unit 302 is not limited thereto.

The distance detection unit 303 is arranged in the vicinity of the pulse wave detection unit 102, detects a distance between a part of the body of the photographer (generally, the thumb of the photographer) and the pulse wave detection unit 102, and outputs a signal corresponding to the detected distance (hereinafter, referred to as a "distance signal") to the control unit 104. For example, an infrared distance sensor or the like is used as the distance detection unit 303; however, the distance detection unit 303 is not limited thereto.

Figure 9:
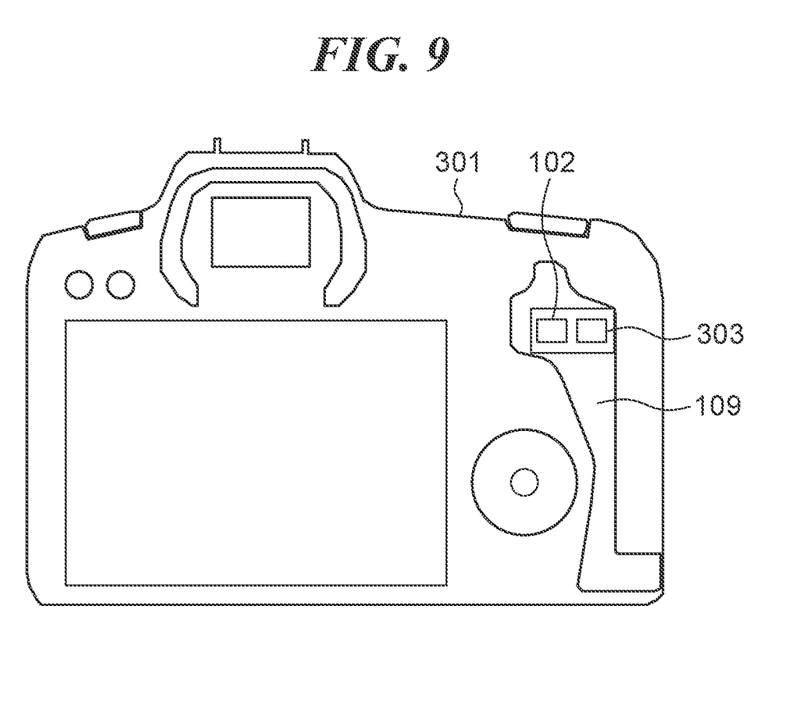
FIG. 9 is a rear view of the image pickup apparatus of FIG. 8.

FIG. 9 is a rear view of the image pickup apparatus 301. The pulse wave detection unit 102 and the distance detection unit 303 are provided at positions close to each other in a grip portion 109 on the back surface of the image pickup apparatus 301. Similarly to the first embodiment, the pulse wave detection unit 102 is provided at a position where a finger (generally a thumb) abuts when the photographer holds the image pickup apparatus 101 so as to make smaller camera shake. It should be noted that the positions where the pulse wave detection unit 102 and the distance detection unit 303 are provided are not limited to the grip portion 109, and the positions can be anywhere as long as the distance detection unit 303 is arranged in the vicinity of the pulse wave detection unit 102 according to the position of the pulse wave detection unit 102.

In the image pickup apparatus 301, the control unit 104 receives the distance signal from the distance detection unit 303, and outputs a pulse wave detection start signal to the pulse wave detection unit 102 in a case where the distance indicated by the distance signal indicates that the finger of the photographer is approaching (is close to) the pulse wave detection unit 102. Then, similarly to the first embodiment, the control unit 104 detects an exposure non-permission period (stagnation period) and an exposure permission period from the pulse wave signal received through the noise reduction unit 302, and adjusts the exposure timing according to the relationship between the exposure non-permission period and the exposure permission period, and the exposure period.

Figure 10:
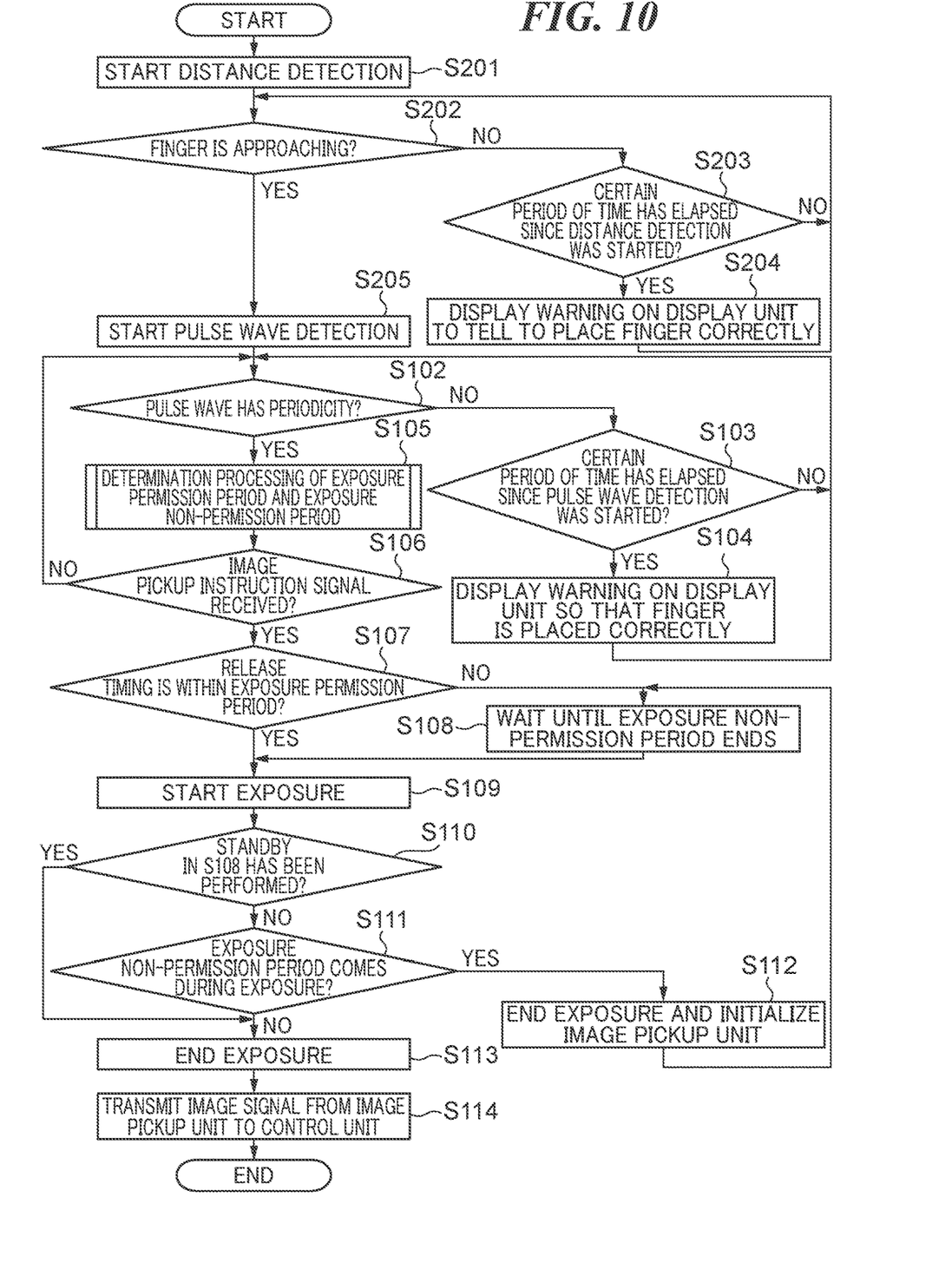
FIG. 10 is a flowchart showing an operation of the image pickup apparatus of FIG. 8.

FIG. 10 is a flowchart showing an operation of the image pickup apparatus 301. Each processing (step) indicated by an S number in this flowchart is realized, by the system LSI of the control unit 104 executing a predetermined program stored in the control unit 104 to comprehensively control the operation of each unit of the image pickup apparatus 301.

In S201, the distance detection unit 303 starts detection of the distance between the finger of the photographer and the pulse wave detection unit 102, and transmits a distance signal to the control unit 104. In S202, the control unit 104 determines whether or not the finger of the photographer is approaching the pulse wave detection unit 102, from the distance signal received from the distance detection unit 303. In a case of determining that the finger of the photographer is not approaching the pulse wave detection unit 102 (NO in S202), the control unit 104 executes the processing of S203.

In step S203, the control unit 104 determines whether or not a certain period of time has elapsed since the distance detection unit 303 started the distance detection. In a case of determining that the certain period of time has not elapsed (NO in S203), the control unit 104 executes the processing of S202 again, and in a case of determining that the certain period of time has elapsed (YES in S203), the control unit 104 executes the processing of S204. In S204, the control unit 104 displays a warning such as "Please place your finger at the correct position" on the display unit 108, and then executes the processing of S202 again.

In a case of determining, in S202, that the finger of the photographer is approaching the pulse wave detection unit 102 (YES in S202), the control unit 104 executes the processing of S205. In S205, the control unit 104 transmits a pulse wave detection start signal to the pulse wave detection unit 102. When receiving the pulse wave detection start signal, the pulse wave detection unit 102 starts pulse wave detection and outputs a pulse wave signal to the noise reduction unit 302. In the second embodiment, the control unit 104 receives the pulse wave signal whose noise has been reduced by the noise reduction unit 302 after being output from the pulse wave detection unit 102. (It should be noted that, in the first embodiment, the control unit 104 directly receives the pulse wave signal from the pulse wave detection unit 102). Since the control unit 104 determines the stagnation period 205 (exposure non-permission period) and the exposure permission period 207 using the pulse wave signal with noise being reduced, the determination accuracy of these periods is improved. The processing after S205 is similar to that of S102 to S114 in the flowchart of FIG. 3, the description thereof is omitted here.

As described above, in the second embodiment, the noise is reduced by the pulse wave signal output from the pulse wave detection unit 102 being passed through the noise reduction unit 302. As a result, it is possible to suppress erroneous determination of the exposure non-permission period due to noise of the pulse wave signal and to correctly determine the exposure non-permission period. In addition, pulse wave detection is not performed in a case where the finger of the photographer is not approaching the pulse wave detection unit 102; therefore, it is possible to prevent the pulse wave detection unit 102 from emitting visible light, in a situation where a photoelectric pulse wave sensor is used for the pulse wave detection unit 102. In this way, it is possible to prevent visible light emitted by the pulse wave detection unit 102 from entering the eyes of the photographer. Further, the effect obtained in the first embodiment can also be obtained in the second embodiment.

It should be noted that, referring to the shutter speed that has not been mentioned so far, in a case of a low shutter speed at which the exposure period covers the exposure permission period 207, the exposure cannot be started. Therefore, the image pickup apparatus 301 may be configured to enable and function the function of the exposure control in the present embodiment, only at a high shutter speed. Furthermore, the image pickup apparatus 301 may be configured to be able to select the validity/invalidity of the function of exposure control in the present embodiment from a setting screen or the like displayed on the display unit 108.

Although the present invention has been described in detail based on the preferred embodiments thereof, the present invention is not limited to these specific embodiments, and various forms without departing from the gist of the present invention are also included in the present invention. Furthermore, each embodiment described above merely shows an embodiment of the present invention, and each embodiment can be appropriately combined.

For example, in the above embodiments, a lens interchangeable camera to which a lens barrel can be attached and detached is taken as the image pickup apparatus 101, 301; however, the present invention is not limited thereto, and a camera such as a compact camera, in which a lens barrel and a main body portion are integrally configured may be taken as the image pickup apparatus 101, 301. Furthermore, the image pickup apparatus according to the present invention can be applied to an electronic device having an image pickup function, and can also be applied to, for example, a portable communication terminal with a camera function (mobile phones, smartphones, etc.), a portable computer with a camera function (tablet terminal), a portable game machine with a camera function, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124217, filed Aug. 3, 2022, which is hereby incorporated by reference wherein in its entirety.

What is claimed is:

1. An image pickup apparatus comprising:
   an image pickup portion;
   a pulse wave detector configured to detect a pulse wave of a photographer who is holding a main body portion including the image pickup portion;
   at least one memory that stores a set of instructions; and
   at least one processor that is configured to, based on the instructions, cause the image pickup apparatus to:
   determine, based on a change amount of a pulse wave signal output from the pulse wave detector, a permission period in which exposure by the image pickup portion is permitted and a non-permission period in which the exposure by the image pickup portion is not permitted; and
   control, only in a case where a shutter speed at the time of picking up an image is faster than a predetermined speed, the exposure by the image pickup portion, based on the determined permission period and the determined non-permission period.

2. The image pickup apparatus according to claim 1, wherein the at least one processor further causes the image pickup apparatus to determine whether or not the pulse wave signal is a periodic signal, and
   wherein in a case where it is determined that the pulse wave signal is a periodic signal, the permission period and the non-permission period are determined.

3. The image pickup apparatus according to claim 2, further comprising a display device,
   wherein the at least one processor further causes the image pickup apparatus to display a warning on the display device in a case where the pulse wave signal is not a periodic signal and a predetermined time has elapsed.

4. The image pickup apparatus according to claim 2, wherein the at least one processor further causes the image pickup apparatus to:
   predict a subsequent permission period and a subsequent non-permission period based on the determined permission period, the determined non-permission period, and a cycle of the pulse wave signal; and
   control the exposure by the image pickup portion, based on the predicted permission period and the predicted non-permission period.

5. The image pickup apparatus according to claim 1, further comprising an instruction device configured to output an image pickup instruction signal instructing start of image pickup, and
   wherein the at least one processor further causes the image pickup apparatus to, in a case where a time at which the image pickup instruction signal is received is not within the permission period, start image pickup at a start of a next permission period.

6. The image pickup apparatus according to claim 5, wherein the at least one processor further causes the image pickup apparatus to, in a case where the time at which the image pickup instruction signal is received is within the permission period, start image pickup by the image pickup portion at the time at which the image pickup instruction signal is received.

7. The image pickup apparatus according to claim 6, wherein the at least one processor further causes the image pickup apparatus to, in a case where the next non-permission period comes during exposure after image pickup by the image pickup portion is started, initialize the image pickup portion and start image pickup again at a start of the next permission period.

8. The image pickup apparatus according to claim 1, further comprising a distance detector configure to detect a distance between a finger of the photographer and the pulse wave detector,
    wherein the at least one processor further causes the image pickup apparatus to output a signal instructing to start detection of a pulse wave of the photographer to the pulse wave detector in a case where it is determined that the finger is approaching the pulse wave detector based on a signal output from the distance detector, and
    wherein the pulse wave detector starts detection of a pulse wave of the photographer when receiving the signal instructing to start detection.

9. The image pickup apparatus according to claim 8, wherein the distance detector is provided in the vicinity of the pulse wave detector.

10. The image pickup apparatus according to claim 1, further comprising a noise reduction circuit configured to reduce noise of the pulse wave signal and output the pulse wave signal with the noise reduced,
    wherein the at least one processor further causes the image pickup apparatus to determine the permission period and the non-permission period based on a change amount of the pulse wave signal output from the noise reduction circuit.

11. A control method for an image pickup apparatus having a main body portion including an image pickup portion, the control method comprising:
    detecting a pulse wave of a photographer who is holding the main body portion;
    determining, based on a change amount of a pulse wave signal which is obtained by the pulse wave of the photographer being detected, a permission period in which exposure by the image pickup portion is permitted and a non-permission period in which the exposure by the image pickup portion is not permitted; and
    controlling, only in a case where a shutter speed at the time of picking up an image is faster than a predetermined speed, the exposure by the image pickup portion, based on the determined permission period and the determined non-permission period.

12. A computer-readable non-transitory storage medium storing a program for executing a method of controlling an image pickup apparatus having a main body portion including an image pickup portion,
    the control method comprising:
    detecting a pulse wave of a photographer who is holding the main body portion;
    determining, based on a change amount of a pulse wave signal which is obtained by the pulse wave of the photographer being detected, a permission period in which exposure by the image pickup portion is permitted and a non-permission period in which the exposure by the image pickup portion is not permitted; and
    controlling, only in a case where a shutter speed at the time of picking up an image is faster than a predetermined speed, the exposure by the image pickup portion, based on the determined permission period and the determined non-permission period.

* * * * *